US008869597B2

(12) United States Patent
Brengartner et al.

(10) Patent No.: US 8,869,597 B2
(45) Date of Patent: Oct. 28, 2014

(54) APPARATUS AND METHOD FOR OPERATING AN APPARATUS FOR DETERMINING AND/OR MONITORING AT LEAST ONE PHYSICAL PROCESS VARIABLE

(75) Inventors: Tobias Brengartner, Emmendingen (DE); Martin Urban, Lorrach (DE); Michael Siegel, Karlsruhe (DE)

(73) Assignee: Endress + Hauser GmbH + Co. KG, Emmendingen (DE)

( * ) Notice: Subject to any disclaimer, the term of this patent is extended or adjusted under 35 U.S.C. 154(b) by 252 days.

(21) Appl. No.: 13/462,933

(22) Filed: May 3, 2012

(65) Prior Publication Data

US 2012/0279283 A1  Nov. 8, 2012

(30) Foreign Application Priority Data

May 3, 2011  (DE) .......................... 10 2011 075 113

(51) Int. Cl.
*G01H 13/00*  (2006.01)
*G01F 23/296*  (2006.01)

(52) U.S. Cl.
CPC ........ *G01F 23/2961* (2013.01); *G01F 23/2967* (2013.01); *G01F 23/2965* (2013.01)
USPC ........................................ 73/32 A; 73/54.41

(58) Field of Classification Search
CPC ............ G01F 23/2961; G01F 23/2967; G01F 23/2965
USPC ............. 73/54.41, 579, 290 V, 861.351, 32 A
See application file for complete search history.

(56) References Cited

U.S. PATENT DOCUMENTS

| 4,044,355 | A | * | 8/1977 | Edvardsson | ................... 342/124 |
| 6,378,364 | B1 | * | 4/2002 | Pelletier et al. | ............. 73/152.47 |
| 2008/0156093 | A1 | * | 7/2008 | Permuy et al. | ................. 73/32 A |

(Continued)

FOREIGN PATENT DOCUMENTS

| DE | 3810669 | 10/1989 |
| DE | 10203461 A1 | 8/2003 |

(Continued)

OTHER PUBLICATIONS

Eng Trans of IPR, Nov. 14, 2013, WIPO, Geneva.

(Continued)

*Primary Examiner* — Hezron E Williams
*Assistant Examiner* — Xin Zhong
(74) *Attorney, Agent, or Firm* — Bacon & Thomas, PLLC

(57) ABSTRACT

A method for operating an apparatus which has an oscillatable unit. The oscillatable unit is excited to oscillate by means of a first frequency sweep within a predetermined frequency band with successive, discrete exciter frequencies of increasing or decreasing frequency. A first exciter frequency is ascertained, in the case of which, during the first frequency sweep, at least one predeterminable criterion is fulfilled. The oscillatable unit is excited by means of a second frequency sweep, wherein the frequency band, compared with the first frequency sweep, is run through in the opposite direction. A second exciter frequency is ascertained, in the case of which, during the second frequency sweep, the at least one predeterminable criterion is fulfilled. From the first exciter frequency and the second exciter frequency, via formation of an average, a measuring frequency for determining and/or monitoring at least one process variable is determined.

11 Claims, 5 Drawing Sheets

(56) References Cited

U.S. PATENT DOCUMENTS

| | | |
|---|---|---|
| 2010/0083752 A1* | 4/2010 | Malinek .................. 73/32 R |
| 2010/0236323 A1* | 9/2010 | D'Angelico et al. ........ 73/54.41 |
| 2011/0179860 A1* | 7/2011 | Urban et al. .................. 73/32 A |
| 2012/0085165 A1* | 4/2012 | Hortenbach et al. ........ 73/290 V |
| 2012/0119758 A1* | 5/2012 | Urban ............................ 324/617 |
| 2012/0174671 A1* | 7/2012 | Urban ............................. 73/579 |

FOREIGN PATENT DOCUMENTS

| | | | |
|---|---|---|---|
| DE | 102009026685 A1 | | 12/2010 |
| EP | 1376076 A1 | | 1/2004 |
| GB | 2350004 A | * | 11/2000 |
| WO | WO 95/29388 | | 11/1995 |
| WO | 0151898 A1 | | 7/2001 |
| WO | 2011038985 A1 | | 4/2011 |

OTHER PUBLICATIONS

German Search Report.

Inter Search Rpt, WO, Jul. 30, 2012, EPO, Munich.

* cited by examiner

APPARATUS AND METHOD FOR OPERATING AN APPARATUS FOR DETERMINING AND/OR MONITORING AT LEAST ONE PHYSICAL PROCESS VARIABLE

TECHNICAL FIELD

The present invention relates to a method for operating an apparatus for determining and/or monitoring with an oscillatable unit at least one physical process variable of a medium, as well as to an apparatus for performing the method. The oscillatable unit is, for example, an oscillatory fork, a single rod, or a membrane introducible into a medium. With an apparatus having such an oscillatable unit, fill level, density, and/or viscosity of a medium can be determined. The oscillatable unit can likewise be embodied as an oscillatable tube, which is flowed through by the measured medium and by means of which process variables such as flow, density, or viscosity are measurable. An apparatus, which includes one or more of such tubes, is, for example, a Coriolis flow measuring device.

BACKGROUND DISCUSSION

Known for determining process variables of a medium in a container are, among others, vibronic measuring devices. These are offered by the assignee in a large number of variants under the marks Liquiphant for liquids and Soliphant for bulk goods. Such vibronic measuring devices have an oscillatable unit in the form of an oscillatory fork, which is composed of a membrane and two paddles protruding therefrom into the medium, or in the form of an oscillatable rod. The oscillatable unit is excited to resonant oscillations, and a change in the oscillation frequency and/or the amplitude of the oscillations and/or the phase between the transmission signal and the received signal is evaluated with respect to the process variable, principally a limit-level or the density of the measured medium. In the case of a vibronic limit level switch for liquids, a distinction is made, for example, between the free state, i.e. a freely oscillating oscillatory fork, and the covered state, i.e. an evaluated oscillatory fork covered by medium. The two states have different resonance frequencies. Furthermore, with such an apparatus, also density and viscosity of the medium are determinable or a phase boundary is detectable.

Other vibronic measuring devices are known for the field of flow measurement. In such case, an oscillatable tube is inserted, as an intermediate piece, into a pipeline flowed through by medium and is excited to oscillations. Via the Coriolis effect, flow velocity is determinable. From the oscillatory behavior, however, information concerning density and viscosity of the medium can also be obtained.

Excitation for execution of mechanical oscillations most often occurs by means of a piezoelectric drive, in the case of which at least one piezoelectric element coupled with the oscillatable unit is supplied with an electrical transmission signal, which it converts to a mechanical signal. Conversely, the mechanical oscillations of the oscillatable unit can be converted into evaluatable electrical signals by means of a piezoelectric receiving unit. Often, the drive unit and receiving unit are embodied as a combined drive/receiving unit and, together with a control/evaluation unit, are arranged in a control loop. This control loop controls the transmission signal in such a manner that a predeterminable phase is present between the transmission signal and received signal.

In Offenlegungsschrift DE 102009026685 A1, an alternative method for digitally controlled excitation of the oscillatable unit to mechanical oscillations is disclosed. In contrast to the analog embodiment, in the case of this largely digital solution, a forced excitation occurs at a particular frequency. In order to find that measuring frequency, in the case of which the predetermined phase shift exists between the received signal and transmission signal, a so-called frequency sweep is performed. In a frequency sweep, the oscillatable unit is excited to oscillations within a particular frequency band in the working range of the sensor and successively with discrete frequencies lying close to one another, and the frequency corresponding to the predetermined phase shift is ascertained. DE 102009028022 A1 describes an advantageous further development of the frequency sweep, which simplifies evaluation of the received signal for finding the measuring frequency, in that the received signal phase is selectively sampled and evaluated only at certain points in time.

A problem arises in the case of said method when only a small amount of time is available for the frequency sweep. The faster the frequency band is run through at a constant number of excited frequencies, the smaller the time, which is available to the oscillatory system to adapt itself to the newly presented frequency. Superpositioning effects occur, which lead to the predetermined phase shift occurring at a frequency different from the actually sought measuring frequency, and thus to the measuring frequency not being correctly ascertainable.

SUMMARY OF THE INVENTION

An object of the invention is to provide a method, which enables finding a measuring frequency rapidly and with high accuracy.

The object is achieved by a method for operating an apparatus for determining and/or monitoring at least one physical process variable of a medium. The apparatus has an oscillatable unit. The oscillatable unit is excited to oscillate by means of a first frequency sweep within a predetermined frequency band in the working range of the oscillatable unit using transmission signals with successive, discrete exciter frequencies of increasing or declining frequency. The corresponding oscillations of the oscillatable unit are received in the form of received signals. A first exciter frequency is ascertained, in the case of which, during the first frequency sweep, at least one predeterminable criterion is fulfilled. The oscillatable unit is excited to oscillate by means of a second frequency sweep within the predetermined frequency band in the form of transmission signals with the same successive discrete exciter frequencies, wherein this frequency band, compared with the first frequency sweep, is run through in the opposite direction. The corresponding oscillations of the oscillatable unit are received in the form of received signals; and a second exciter frequency is ascertained, in the case of which, during the second frequency sweep, the at least one predeterminable criterion is fulfilled. From the first exciter frequency and the second exciter frequency, via formation of an average, a measuring frequency for determining and/or monitoring at least one process variable is determined.

The terminology "measuring frequency" means that frequency, which is of relevance for determining and/or monitoring at least one process variable. For determining the process variable, either the value of the measuring frequency itself, or the signal received from exciting the oscillatable unit with the measuring frequency is evaluated. Furthermore, both the measuring frequency as well as also the received signal recorded at the measuring frequency can be evaluated.

According to the invention, two frequency sweeps are performed one after the other, and the results are combined with one another. For this purpose, the frequency band is run through once with frequencies of increasing level and once with frequencies of decreasing level. In such case, it is not important whether the frequency band is run through first in a decreasing or increasing direction. The parameters of the two frequency sweeps should, in such case, be essentially identical, i.e. the same frequencies are excited, the sampling rate is constant and the duration of the frequency sweeps is equal, so that the same period of time lies between the exciting of two successive frequencies. The two frequency sweeps thus differ only in the direction, in which the frequency sequence is progressed through. Sampling and evaluation of the individual frequency sweeps can occur in manner known from the state of the art.

The measuring frequency determined as the average value of the two ascertained exciter frequencies is independent of amplitude errors or phase errors, which occur due to beat effects in the received signal of a sweep. The errors in the case of determining the exciter frequency in an upwards sweep and a downwards sweep are compensated during the average formation, so that the measuring frequency is determinable reliably and with high accuracy. The accuracy is, in such case, not dependent on the time required for first or second frequency sweep, so that the determining of the measuring frequency is ascertainable even in shortest amount of time without losses in accuracy. Since the dynamic properties of the sensor are compensated for, the achievable accuracy is only determined and thus adjustable by the frequency step width.

A further advantage of the method lies in the fact that in the case of continuous exciting with frequency sweeps, due to the exciting with frequencies in reverse order following a particular frequency sweep, no large jumps in the excitation frequency occur, and the demands made on the electronic components, such as, for example, adaptive filters, can thus be correspondingly smaller. The method thus not only saves time for performing the measuring, but also saves costs in terms of installed components.

The method is, in principle, applicable for all measuring devices of vibration type. This includes both fill level measuring devices, density measuring devices and viscosity measuring devices, as well as also flow measuring devices.

In a first embodiment of the solution of the invention, ascertained as the measuring frequency is the resonance frequency or a frequency, in the case of which a predeterminable phase shift between the transmission signal and received signal is present, especially the eigenfrequency of the oscillatable unit. The eigenfrequency corresponds to the frequency, in the case of which a phase shift of 90° is present.

In a further development of the method of the invention, predetermined as the criterion for determining the first exciter frequency and the second exciter frequency is the presence a maximum or minimum amplitude and/or a particular phase shift between the transmission signal and the received signal.

In an additional further development of the invention, the difference between the first exciter frequency and the second exciter frequency is ascertained, and from the difference between the first exciter frequency and the second exciter frequency, the degree of damping of the oscillations is determined.

In an embodiment of the invention, from the degree of damping of the oscillations, the viscosity of the medium is determined. The association occurs on the basis of a stored relationship between the degree of damping and viscosity and/or between the frequency difference and viscosity.

An embodiment of the method includes that based on the degree of damping in the case of an oscillation in air, it is ascertained whether accretion is clinging to the oscillatable unit or whether the oscillatable unit is corroded. Whether the oscillatable unit oscillates in air, can, for example, be detected based on the eigenfrequency or resonance frequency.

An embodiment of the invention provides that progression of the degree of damping is monitored as a function of time, and a change of the viscosity or an accretion formation or corrosion formation is detected therefrom.

In a further development of the method, after determining the measuring frequency, the oscillatable unit is excited to oscillate with the measuring frequency for determining and/or monitoring at least one process variable. In this case, the frequency sweeps first and foremost serve for determining the measuring frequency, with which the oscillatable unit is excited at least during a certain time period subsequent to the sweeps. Due to the excitation with only one particular frequency, no superimposing of oscillations of different frequencies occur, so that the signal received in such case is representative for at least one process variable to be determined.

An alternative embodiment includes that, after determining the measuring frequency, the measuring frequency is evaluated as regards at least one process variable, and another set of first and second frequency sweeps for another ascertaining of the measuring frequency is performed. If the process variable can already be ascertained from the measuring frequency, an interruption of the exciting by means of frequency sweeps is not required. Due the continuous performing of the frequency sweeps for determining the measuring frequency, the current measuring frequency is always known.

In an embodiment of the invention, as the process variable, at least one of the variables from the group comprising fill level, density, viscosity, mass flow and volume flow is determined and/or monitored.

Additionally, the object of the invention is achieved by the features of an apparatus for performing the method of the invention. This apparatus comprises: a mechanically oscillatable unit; a drive/receiving unit, which excites the oscillatable unit by means of transmission signals to mechanical oscillations and receives oscillations of the oscillatable unit and converts these into electrical received signals; and an electronics unit, which at least evaluates the received signals. Such apparatuses for determining one or more process variables of a medium are known by the name "vibratory measuring device". In the case of a first group of measuring devices, the oscillatable unit is, at least at times, immersed in the medium, and is embodied, for example, as an oscillatory fork, a membrane, a rod, or a closed pipe.

In the case of a second group, the oscillatable unit is, for example, one or more tubes, through which the medium flows at least at times.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
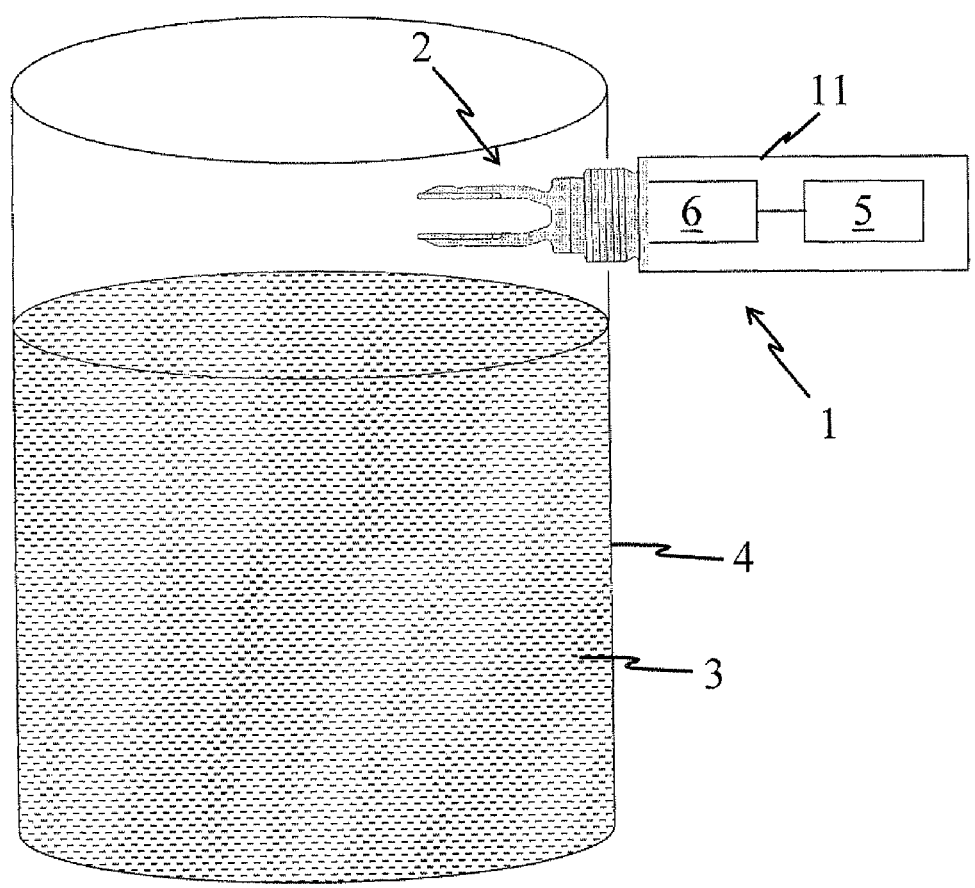
FIG. 1 is a schematic representation of a vibronic fill level measuring device.

FIG. 1 shows a so called oscillatory fork as an example of a vibronic fill level measuring device 1, with which also density and/or viscosity of the medium 3 are measurable. The oscillatable unit 2 is formed by a membrane and two paddles, wherein the paddles are arranged symmetrically on the membrane. The membrane closes a tubular housing 11 at the latter's end, wherein, arranged in such housing 11 are, for example, the drive/receiving unit 6 for producing and receiving the mechanical oscillations of oscillatable unit 2, as well as an electronics unit 5 for open and/or closed loop control of the oscillation excitement and for evaluating the received signals and determining the process variables. Preferably, drive/receiving unit 6 is an electromechanical transducer, especially a piezoelectric stack drive, which is in contact with the inner side of the membrane and thus excites the oscillatable unit 2 to oscillate.

The fill level measuring device 1 is installed in the wall of the container 4 at a fill level to be monitored. In this embodiment, a maximum fill level is monitored; the monitoring of a minimum fill level, for example, as running dry protection for downstream pumps, is, however, likewise possible. Before the fill level of the medium 3 reaches the maximum level, the oscillatable unit 2 oscillates in air; upon reaching and exceeding this maximum fill level, the oscillatable unit 2 becomes covered by medium 3. This results in a change in the resonance frequency and also in the eigenfrequency. Such a change is detected for fill level monitoring. The illustrated apparatus 1 can likewise by applied as a density and/or viscosity measuring device, since density and viscosity likewise have an influence on the oscillation characteristic. The degree of covering of oscillatable unit 2 with the process medium 3 should, however, be known for determining these two process variables.

With the method of the invention, the measuring frequency can be rapidly and precisely ascertained. For this, two frequency sweeps with the same parameters are performed, in that a predetermined frequency band is run through with a plurality of discrete, successive frequencies for exciting the mechanically oscillatable unit. The frequency of the transmission signal is thus continually changed. The two frequency sweeps differ only in the direction of movement through the predetermined frequency band.

The goal of the two frequency sweeps is, in each case, to ascertain a particular exciter frequency $f_1$, $f_2$, which fulfils at least one predeterminable criterion. The criterion is selected in such a manner that two corresponding frequencies are ascertained. "Corresponding" refers to the received signals of the frequency sweeps being symmetrical, and consequently, points corresponding to one another in amplitude and relative position in the respective received signal can be determined. These corresponding frequencies have in terms of magnitude an equal difference with respect to the frequency, which the symmetry axis determines and which corresponds to the sought measuring frequency. Via average formation, the measuring frequency $f_m$ is determined from the two exciter frequencies $f_1$, $f_2$.

In an embodiment, the eigenfrequency of the system is ascertained. For this, based on the two sweeps, a frequency $f_1$, $f_2$ is in each case determined, in the case of which, during the sweep, the transmission signal and received signals have a particular phase shift with respect to one another. The average value of these two exciter frequencies $f_1$, $f_2$ then gives the actual measuring frequency $f_m$, in the case of which the predetermined phase shift is present independently of a sweep. The eigenfrequency determined thusly can be established as the exciter frequency, so that the oscillatable unit is subsequently excited at least for a particular period of time with the eigenfrequency. This enables, for example, the determining and evaluation of the associated amplitude.

As a rule, the phase shift is predetermined at 90°, in order to excite the oscillatable unit with the eigenfrequency and to determine the fill level or density. A high viscosity can, however, influence the measuring. So that the viscosity does not act as a disturbing variable, a phase shift different from 90° can be specified, which, for example, lies between 40° and 70°.

In an alternative embodiment, the current resonance frequency is determined by means of the method of the invention. Following this, the method can be repeated, so that the current resonance frequency is continually determined. This can be evaluated as regards a process variable to be determined or monitored, for example, the fill level of the medium 3.

Figure 2:
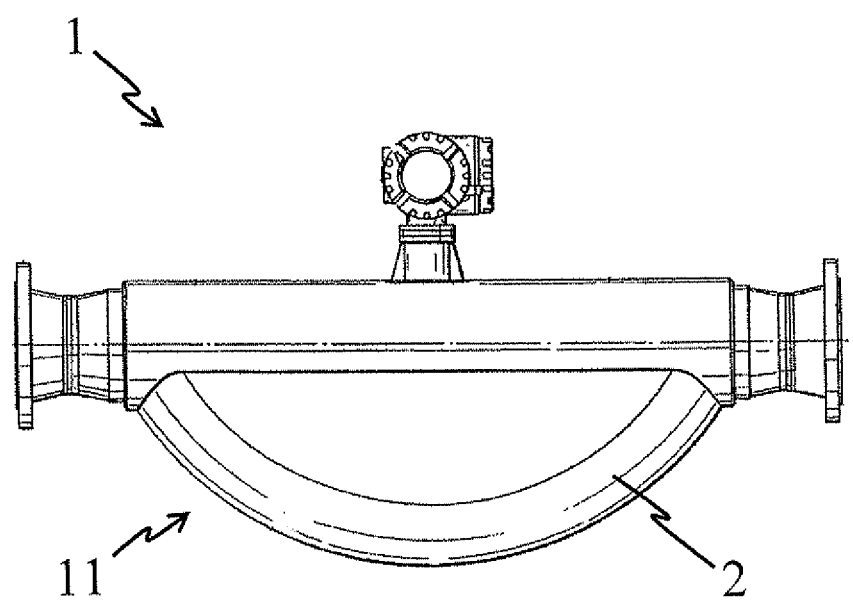
FIG. 2 is a schematic representation of a vibronic flow measuring device.

FIG. 2 shows a measuring transducer of Coriolis type, by means of which flow, density and/or viscosity of a medium are determinable. Such a measuring device 1 is pressure-tightly inserted in a pipeline as an intermediate piece, for example, by means of flanges. The oscillatable unit 2 is a measuring tube, through which, at least at times, medium is flowing. Equally, the oscillatable unit 2 can comprise a number of measuring tubes. For measuring, the measuring tube is excited with the resonance frequency to oscillate. The controlling of the measuring frequency usually occurs with a PLL (phase locked loop). With help the method of the invention, the resonance frequency of the system can be found, so that this frequency is settable as the starting frequency for PLL. In this way, it is prevented that the PLL locks on a disturbance frequency instead of the resonance frequency.

Figure 3:
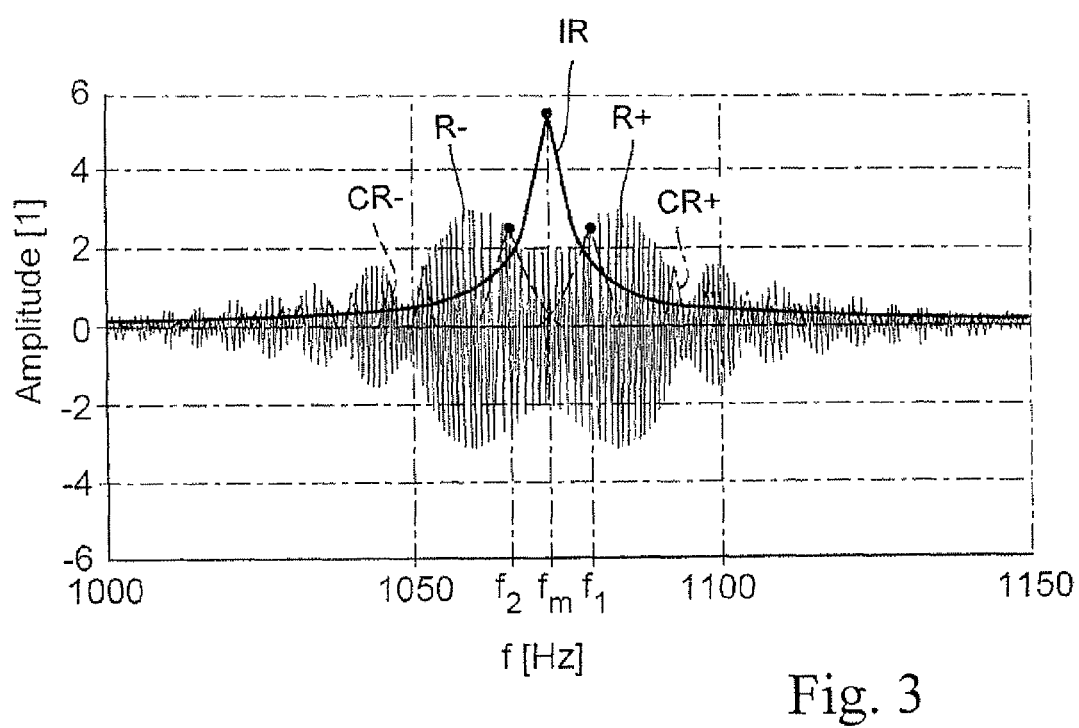
FIG. 3 is an amplitude frequency diagram of the received signals for an upwards sweep and a downwards sweep.

FIG. 3 shows an amplitude frequency diagram with recorded and calculated signals. In this diagram, the received signal $R^+$ of a first frequency sweep and the received signal $R^-$ of a second frequency sweep are presented. The mechanical oscillations of the oscillatable unit 2 leading to these received signals $R^+$, $R^-$ are essentially undamped. In the case of the first frequency sweep, the frequency band was progressed through with increasing frequency, while the frequencies in the second frequency sweep were excited in a decreasing direction. Further presented is the magnitude of the ideal curve of the received signal IR, which is present when no modulations due to mutually superimposing oscillations occur. The peak lies at the resonance frequency.

Moreover, for two frequency sweeps, a signal $CR^+$, $CR^-$ calculated from the respective received signal $R^+$, $R^-$ is presented, whose maxima are associated with frequencies, in the case of which the received signal $R^+$, $R^-$ and the transmission signal have a predetermined phase shift relative to one another.

The smaller the sweep time—that is the duration, which is available for a frequency sweep in the case of a predetermined separation of frequencies to be excited for movement through the predetermined frequency band—the more strongly the received signals $R^+$, $R^-$ deviate from the ideal signal IR. This is to be attributed to beat phenomena in the received signal $R^+$, $R^-$, which lead to a corruption of the amplitude and phase information. The maximum amplitude of the received signal $R^+$, $R^-$ consequently does not occur at the actual resonance frequency. Likewise, a point with a particular phase shift between the transmission signal and received signal shifts, as is to be seen in the marked main maxima of the calculated signals $CR^+$, $CR^-$.

The illustrated received signals $R^+$, $RR^-$ of the first frequency sweep and of the second frequency sweep are mirror symmetrical about a line, which extends parallel to the ordinate and which intersects the abscissa at the resonance frequency. The correct resonance frequency can, consequently, be determined by forming the average value of the two frequencies, at which the maxima occur in the received signals $R^+$, $R^-$ of the increasing and decreasing frequency sweeps.

In order to ascertain two corresponding exciter frequencies $f_1$, $f_2$ of the first frequency sweep and the second frequency sweep, at least one criterion is established, which the received signal $R^+$, $R^-$ or a signal $CR^+$, $CR^-$ derived from the received signal $R^+$, $R^-$ must fulfill, either alone or in connection with the transmission signal or a signal derived therefrom. Two corresponding exciter frequencies $f_1$, $f_2$ have an equal difference with respect to the sought measuring frequency $f_m$, wherein the difference is distinguished in the sign. The average value of the first exciter frequency $f_1$ and the second exciter frequency $f_2$ corresponds, consequently, to the sought measuring frequency $f_m$.

If the resonance frequency is the sought measuring frequency $f_m$, preferably that frequency is in each case ascertained as first exciter frequency $f_1$ and, respectively, second exciter frequency $f_2$, in the case of which the respective received signal has a global maximum. An alternative criterion for determining the resonance frequency is the presence of a particular local maximum or minimum. By a "particular local maximum or minimum" is meant the i-th, for example, the first, second or third, of the N local maxima or minima occurring in the recorded received signal.

For determining a measuring frequency, in the case of which a predeterminable phase shift between the transmission signal and received signal is present, a requirement for phase shift between transmission signal and received signal present during the particular frequency sweep is established as a criterion. As a rule, a number of frequencies exist, in the case of which a particular phase shift occurs, so that the fulfillment of an additional criterion is required for a unique determining of the exciter frequencies $f_1$, $f_2$. Preferably, from all frequencies, in the case of which a predetermined phase shift is present, that frequency $f_1$, respectively $f_2$ is determined, in the case of which the corresponding amplitude of the received signal is highest. This case is presented in FIG. 3.

For case in which the phase shift is set at 90° and the damping is so small that the eigenfrequency and resonance frequency of the oscillatable unit are the same, the measurement frequencies $f_m$ determined by means of said different criteria coincide, and correspond to the frequency, at which the ideal received signal IR has the maximum.

Besides the criteria named by way of example, also other criteria for finding the two exciter frequencies $f_1$, $f_2$ arranged symmetrically around the measuring frequency $f_m$ to be ascertained are, of course, useable. The choice of the best suited criterion or best suited combination of a plurality of criteria ultimately depends on the measuring frequency $f_m$ to be ascertained—for example, resonance frequency or frequency in the case of which a particular phase relationship exists, especially eigenfrequency—as well as on the embodiment of the electronics unit and the evaluating algorithms available.

Figure 4:
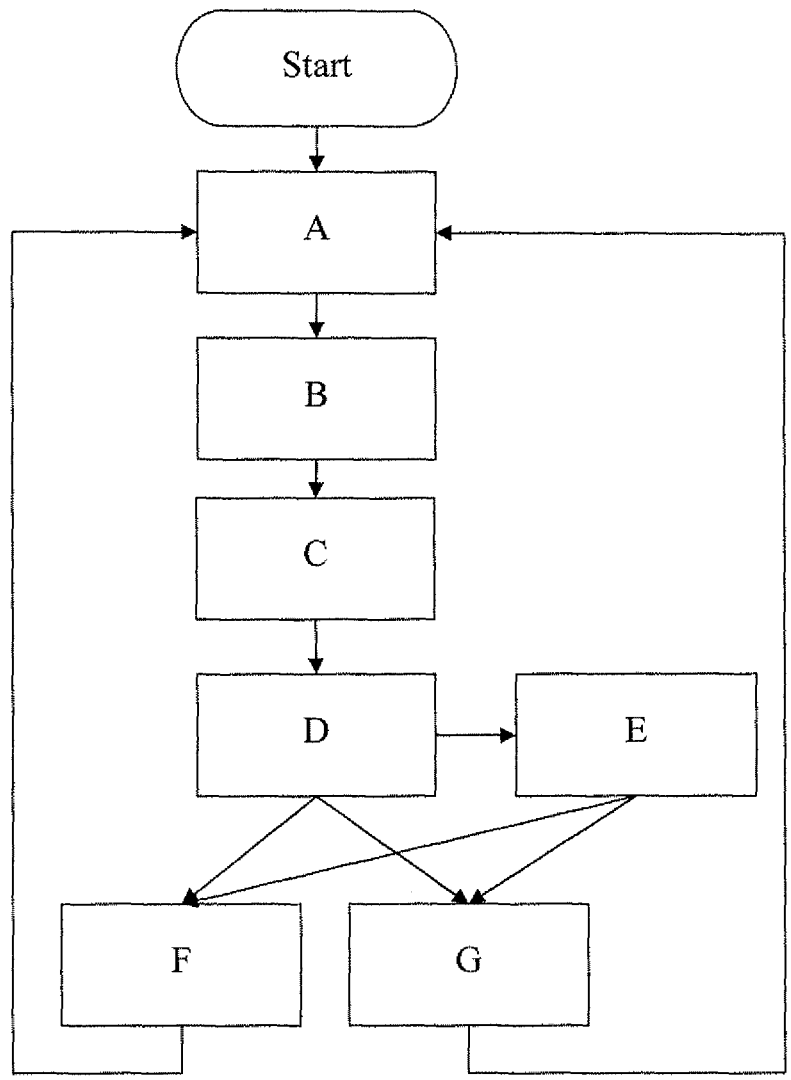
FIG. 4 is a flow diagram of an embodiment of the method.

A concrete embodiment of the method of the invention will now be explained in the following in greater detail on the basis of the flow diagram illustrated in FIG. 4. As measuring frequency $f_m$, that frequency should be determined, in the case of which between the transmission signal and received signal, a predeterminable phase shift of 90° exists.

In a first step A, the parameters of the two desired frequency sweeps, as well as the property of the measuring frequency $f_m$ to be determined are established. In this case, the property of measuring frequency $f_m$ lies in the fact that, at the measuring frequency $f_m$, a phase shift of 90° between transmission signal and received signal is present. The algorithm for evaluation of the received signals is correspondingly fixed, or criteria are correspondingly established. The frequency band, in which the sought measuring frequency $f_m$ lies, is, for example, predetermined by the geometry of the oscillatable unit and is, consequently, known. Furthermore, the step width, i.e. the distance between two excited frequencies, and the sweep time, i.e. the time, which is used for a frequency sweep, are fixed. Via the step width, the resolution of the recorded received signal is predeterminable.

In a second step B, the exciting of the oscillatable unit 2 occurs with a first frequency sweep in an increasing direction, i.e. with the lowest frequency of the frequency band at the beginning. Likewise, one could begin with a decreasing sweep. At the same time, the particular received signal $R^+$ is sampled and processed. The evaluation advantageously occurs with the algorithm described in DE 102009028022 A1. By means of the phase selective sampling described there, a calculated received signal is produced, from whose maxima, all frequencies are determinable, in the case of which, for measured received signal, the predetermined phase shift exists between transmission signal and received signal, in this example 90°. A received signal calculated in such a manner is presented in FIG. 3. From all frequencies, which fulfill the phase condition, that exciter frequency—called the first exciter frequency $f_1$—is ascertained, in the case of which the received signal or calculated received signal possesses the greatest amplitude.

In a next step C, a second frequency sweep is performed with the same parameters as the first frequency sweep, but in a decreasing direction. In other words, frequency band, step width and sweep time are equal. Solely the direction, in which the frequency band is run through, is different from the first frequency sweep. The received signal $R^-$ recorded during the second frequency sweep is evaluated in a manner equal to the earlier recorded received signal $R^+$, and the second exciter frequency $f_2$ is ascertained analogously to first exciter frequency $f_1$.

In the next step D, from the first exciter frequency $f_1$ and the second exciter frequency $f_2$, the sought measuring frequency $f_m$ is determined by forming the average value of the two ascertained exciter frequencies, i.e. $(f_1+f_2)/2$.

Optionally, in a next step E, the difference $f_1-f_2$ between first exciter frequency $f_1$ and second exciter frequency $f_2$ is determined, and therewith, the degree of damping D of the medium 3 is ascertained. From this, the viscosity of the medium 3 can be ascertained, to the extent that the oscillatable unit 2 is covered during the sweep with medium 3, or information can be extracted concerning the state of oscillatable unit 2 with respect to accretion or corrosion, to the extent that oscillatable unit 2 oscillates uncovered.

In a first variant, the determining of the measuring frequency $f_m$ is followed in a step F by the exciting of the oscillatable unit 2 at least for a certain time period with the measuring frequency $f_m$. From the received signal gained in the case of monofrequent excitation, at least one process variable is then determined or monitored, for example, based on the amplitude and/or measuring frequency $f_m$. For example, the fill level can be determined or monitored based on measuring frequency $f_m$ and the associated amplitude. The method for measurement frequency determination can then, for example, be performed again at regular intervals.

In a second variant, the determining of measuring frequency $f_m$ is followed by, as next step G, evaluation of the measuring frequency $f_m$ as regards a process variable, for example, the density or fill level. This is followed by another run-through, i.e. another performing of an increasing and a decreasing frequency sweep, the ascertaining of the two exciter frequencies $f_1$, $f_2$ and the determining of the measuring frequency $f_m$. In this case, sweeps are thus virtually continually performed.

Figure 5:
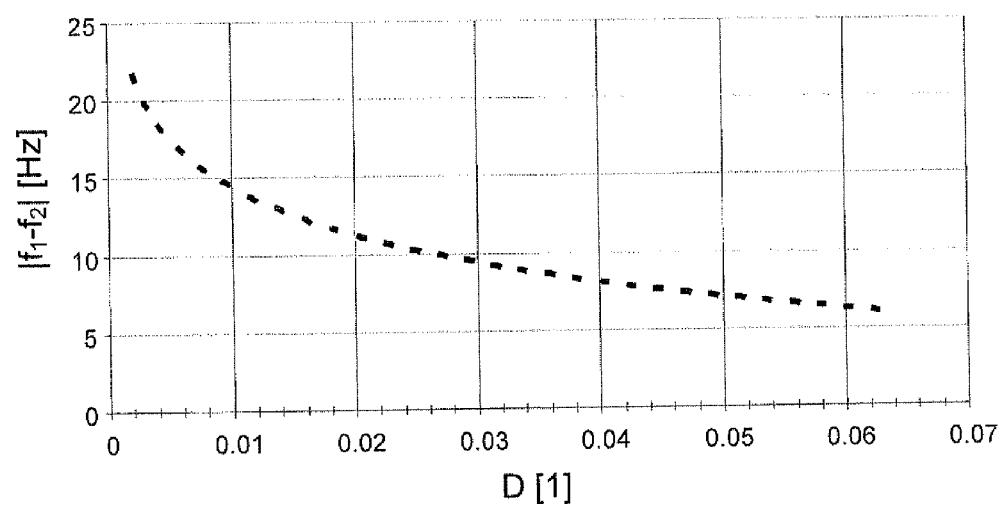
FIG. 5 is a frequency versus degree of damping diagram.

FIG. 5 shows the dependence of the magnitude of the difference $|f_1-f_2|$ between the first exciter frequency $f_1$ and the second exciter frequency $f_2$ on the degree of damping D, also called "Lehr's measure of damping". The smaller the damping of the oscillations, the stronger are the arising modulations and the greater the distance between the first exciter frequency $f_1$ and the second exciter frequency $f_2$.

From the difference $|f_1-f_2|$ of the two exciter frequencies, which were ascertained by means of two frequency sweeps performed in opposing directions, the degree of damping D is thus measurable. This is a measure for viscosity of the medium. Preferably, in the electronics unit of the measuring device, a relationship between frequency difference and viscosity is stored, for example, in the form a characteristic curve, formula or table. During operation of the measuring device, the frequency difference $|f_1-f_2|$ between first exciter frequency $f_1$ and second exciter frequency $f_2$ can then be ascertained, and therefrom, the viscosity of the medium can be determined. Such a viscosity determination is especially advantageous, since the viscosity is virtually incidentally determinable, while by means of the measuring frequency $f_m$, another process variable is ascertainable, especially independently of the viscosity.

The degree of damping D furthermore enables a diagnosis of the state of the oscillatable unit. For this, progression of the degree of damping D in time is monitored, for example, in the case of oscillation in air, or a current degree of damping D is compared with a starting value. The starting value can be ascertained, for example, at the start-up of the apparatus. If accretion has formed on the oscillatable unit, the damping of the oscillations is higher than without accretion. Via the determining of the frequency difference, also a detection of accretion is thus implementable. Since accretion also affects the reliability of the determining of other process variables, detection of accretion enables assuring reliable measurements. In the case of accretion formation, a warning signal is preferably output to the operating personnel or to a control room.

Conversely, from a decrease in the damping in the case of constant environmental parameters, corrosion of the oscillatable unit can be detected. Evaluation of the frequency difference $|f_1-f_2|$ is thus not only advantageous for viscosity determination, but also likewise as regards predictive maintenance.

The invention claimed is:

1. A method for operating an apparatus for determining and/or monitoring at least one physical process variable of a medium, which apparatus has an oscillatable unit, comprising the steps of:
oscillating the oscillatable unit to oscillate by means of a first frequency sweep within a predetermined frequency band in the working range of the oscillatable unit using transmission signals with successive, discrete exciter frequencies of increasing or decreasing frequency;
receiving corresponding oscillations of the oscillatable unit in the form of received signals;
ascertaining a first exciter frequency, in the case of which, during the first frequency sweep, at least one predeterminable criterion is fulfilled;
oscillating the oscillatable unit to oscillate by means of a second frequency sweep within the predetermined frequency band in the form of transmission signals with the same successive, discrete exciter frequencies;
running through the frequency band, compared with the first frequency sweep, in opposite direction;
receiving the corresponding oscillations of the oscillatable unit in form of said received signals;
ascertaining a second exciter frequency, in the case of which, during the second frequency sweep, the at least one predeterminable criterion is fulfilled; and
determining a measuring frequency for determining and/or monitoring at least one process variable, via formation of an average from said first exciter frequency and said second exciter frequency.

2. The method as claimed in claim 1, wherein:
ascertained as the average measuring frequency is the resonance frequency or a frequency, in the case of which a predeterminable phase shift between transmission signal and received signal is present, especially an eigenfrequency of the oscillatable unit.

3. The method as claimed in claim 1, wherein:
predetermined as criterion for determining the first exciter frequency and the second exciter frequency is the presence of a maximum or minimum amplitude and/or a particular phase shift between the transmission signal and the received signal.

4. The method as claimed in claim 1, wherein:
after determining the average measuring frequency, the oscillatable unit is excited to oscillate with the measuring frequency for determining and/or monitoring at least one process variable.

5. The method as claimed in claim 1, wherein:
after determining the average measuring frequency, the average measuring frequency is evaluated as regards at least one process variable, and another set of first and second frequency sweeps for another ascertaining of the average measuring frequency are performed.

6. The method as claimed in claim 1, wherein:
as the process variable, at least one of the variables from the group comprising fill level, density, viscosity, mass flow and volume flow is determined and/or monitored.

7. The method as claimed in claim 1, wherein:
a difference between the first exciter frequency and the second exciter frequency is ascertained and from the difference between the first exciter frequency and the second exciter frequency, the degree of damping of the oscillations is determined.

8. The method as claimed in claim 7, wherein:
based on the degree of damping in the case of oscillation in air, it is ascertained whether accretion is clinging to the oscillatable unit or whether the oscillatable unit is corroded.

9. The method as claimed in claim 7, wherein:
from the degree of damping of the oscillations, viscosity of the medium is determined.

10. The method as claimed in claim 9, wherein:
progression of the degree of damping is monitored as a function of time, and therefrom, a change in viscosity or accretion or corrosion is detected.

11. An apparatus for determining and/or monitoring at least one physical process variable of a medium comprising:
a mechanically oscillatable unit;
a drive/receiving unit, which is arranged to excite said oscillatable unit by means of a first frequency sweep within a predetermined frequency band in the working range of the oscillatable unit using transmission signals with successive, discrete exciter frequencies of increasing or decreasing frequency;

an electronics unit for open and/or closed loop control of the oscillation excitement and for evaluating the received signals and determining the process variables;

wherein said electronics unit is arranged to receive corresponding oscillations of the oscillatable unit in the form of received signals;

wherein said electronics unit is arranged to ascertain a first exciter frequency, in the case of which, during the first frequency sweep, at least one predeterminable criterion is fulfilled;

wherein said drive/receiving unit is further arranged to oscillate the oscillatable unit by means of a second frequency sweep within the predetermined frequency band in the form of transmission signals with the same successive, discrete exciter frequencies;

wherein said drive/receiving unit is arranged to run through the frequency band, compared with the first frequency sweep, in opposite direction;

wherein said electronics unit is arranged to receive the corresponding oscillations of the oscillatable unit in form of said received signals;

wherein said electronics unit is arranged to ascertain a second exciter frequency, in the case of which, during the second frequency sweep, the at least one predeterminable criterion is fulfilled; and wherein said electronics unit is embodied to determine a measuring frequency for determining and/or monitoring at least one process variable, via formation of an average from said first exciter frequency and said second exciter frequency.

* * * * *